United States Patent
Choi

(10) Patent No.: US 7,165,008 B2
(45) Date of Patent: Jan. 16, 2007

(54) VEHICLE ANTI-ROLLOVER MONITOR USING KINETIC ENERGY AND LATERAL ACCELERATION

(75) Inventor: S. Ben Choi, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/719,968

(22) Filed: Nov. 21, 2003

(65) Prior Publication Data

US 2005/0114072 A1    May 26, 2005

(51) Int. Cl.
G01P 15/00    (2006.01)

(52) U.S. Cl. ......................................... 702/141; 701/45

(58) Field of Classification Search ................ 702/141, 702/151; 701/36, 45, 70, 71, 91, 38, 28; 73/8; 303/112; 340/440
See application file for complete search history.

(56) References Cited

U.S. PATENT DOCUMENTS

| | | | |
|---|---|---|---|
| 5,765,118 A * | 6/1998 | Fukatani | 701/72 |
| 6,065,558 A | 5/2000 | Wielenga | |
| 6,263,261 B1 | 7/2001 | Brown et al. | |
| 6,282,474 B1 | 8/2001 | Chou et al. | |
| 6,356,188 B1 | 3/2002 | Meyers et al. | |
| 6,370,467 B1 * | 4/2002 | Kimbrough | 701/71 |
| 6,421,592 B1 * | 7/2002 | Bargman et al. | 701/45 |
| 6,856,868 B1 * | 2/2005 | Le et al. | 701/38 |
| 2002/0056582 A1 | 5/2002 | Chubb et al. | |
| 2002/0173882 A1 | 11/2002 | Tobaru et al. | |
| 2003/0055549 A1 * | 3/2003 | Barta et al. | 701/70 |
| 2003/0100979 A1 | 5/2003 | Lu et al. | |
| 2003/0182041 A1 * | 9/2003 | Watson | 701/45 |

FOREIGN PATENT DOCUMENTS

| | | |
|---|---|---|
| DE | 19958895 | 6/1999 |
| EP | 0901929 | 3/1999 |
| JP | 2000168526 | 6/2000 |

\* cited by examiner

*Primary Examiner*—John Barlow
*Assistant Examiner*—Xiuqin Sun
(74) *Attorney, Agent, or Firm*—MacMillan, Sobanski & Todd, LLC

(57) ABSTRACT

A method is provided for detecting a rollover event of a vehicle. A lateral kinetic energy of the vehicle is determined in response to vehicle longitudinal velocity and vehicle side slip angle. A lateral acceleration of the vehicle is measured. A rollover potentiality index is determined in response to the lateral kinetic energy and the lateral acceleration. A rollover index is determined by weighting the rollover potentiality index by a factor of the lateral acceleration. A comparison is made to determine if the rollover index is above a predetermined threshold.

30 Claims, 6 Drawing Sheets

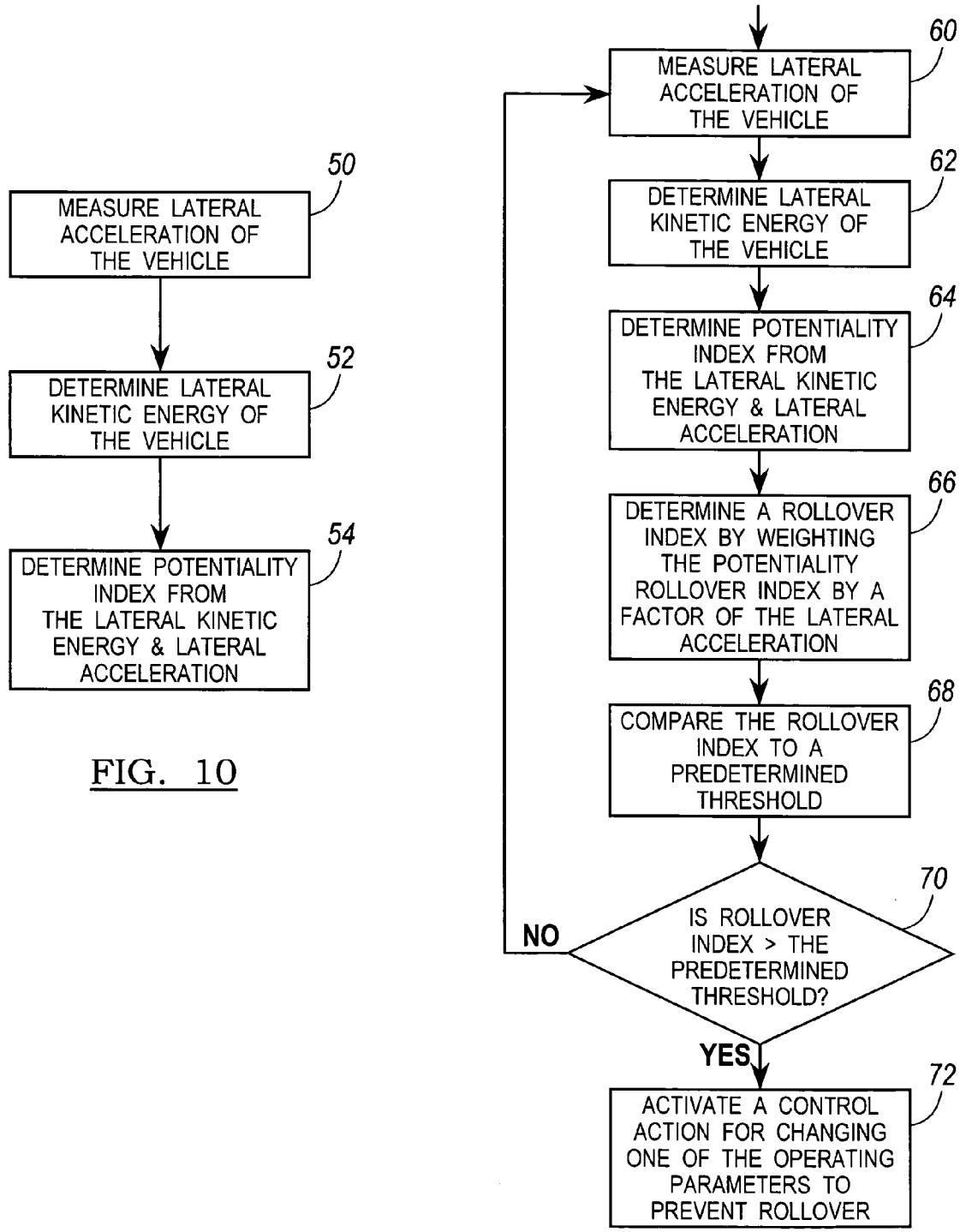

VEHICLE ANTI-ROLLOVER MONITOR USING KINETIC ENERGY AND LATERAL ACCELERATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to a method for estimating the propensity of a vehicle to rollover, and more specifically, to a method for detecting a rollover event of a vehicle and providing a corrective action to reduce the likelihood of an actual rollover.

2. Description of the Related Art

Dynamic stability control systems have been implemented in vehicles to deter a vehicle from actually rolling over. Vehicle rollovers have become a growing concern for vehicles with a high center of gravity and especially those used for multiple purposes in different geographical locations. A vehicle may have the potential to rollover due to forces exerted on a vehicle under different types of operating conditions. Methods have been used to anticipate when the vehicle has the propensity to rollover and to make adjustments to counteract such vehicles from rolling over. A rollover event may be defined as a moment when the current operating conditions (e.g. speed, steering angle, lateral acceleration etc.) are beginning to approach a threshold where the rollover could actually occur. Typically, stability control systems detect or estimate the propensity for a rollover event to occur by measuring a role angle or a roll rate. This requires a dedicated sensor for determining the roll angle at each instance the vehicle is in travel. Sensors are costly and require dedicated wiring and packaging locations. Vehicle manufacturers are consistently looking for reliable methods which can obtain the same results yet cost less and minimize the number of components on the vehicle.

SUMMARY OF THE INVENTION

The present invention provides a method for detecting a rollover event of a vehicle and providing a corrective action to counteract an actual rollover based on lateral kinetic energy and lateral acceleration of the vehicle.

In one aspect of the invention, a method is provided for detecting a rollover event of a vehicle. A lateral kinetic energy of the vehicle is determined in response to vehicle longitudinal velocity and vehicle side slip angle. A lateral acceleration of the vehicle is measured. A rollover potentiality index is determined in response to the lateral kinetic energy and the lateral acceleration. A rollover index is determined by weighting the rollover potentiality index by a factor of the lateral acceleration. A comparison is made to determine if the rollover index is above a predetermined threshold.

Various objects and advantages of this invention will become apparent to those skilled in the art from the following detailed description of the preferred embodiment, when read in light of the accompanying drawings.

BRIEF DESCRIPTION OF THE DRAWINGS

FIG. 10 illustrates a method for estimating the propensity of a vehicle to rollover.

FIG. 11 illustrates a method for detecting a rollover event and providing corrective actions to avoid an actual rollover.

DETAILED DESCRIPTION OF PREFERRED EMBODIMENTS

Figure 1:
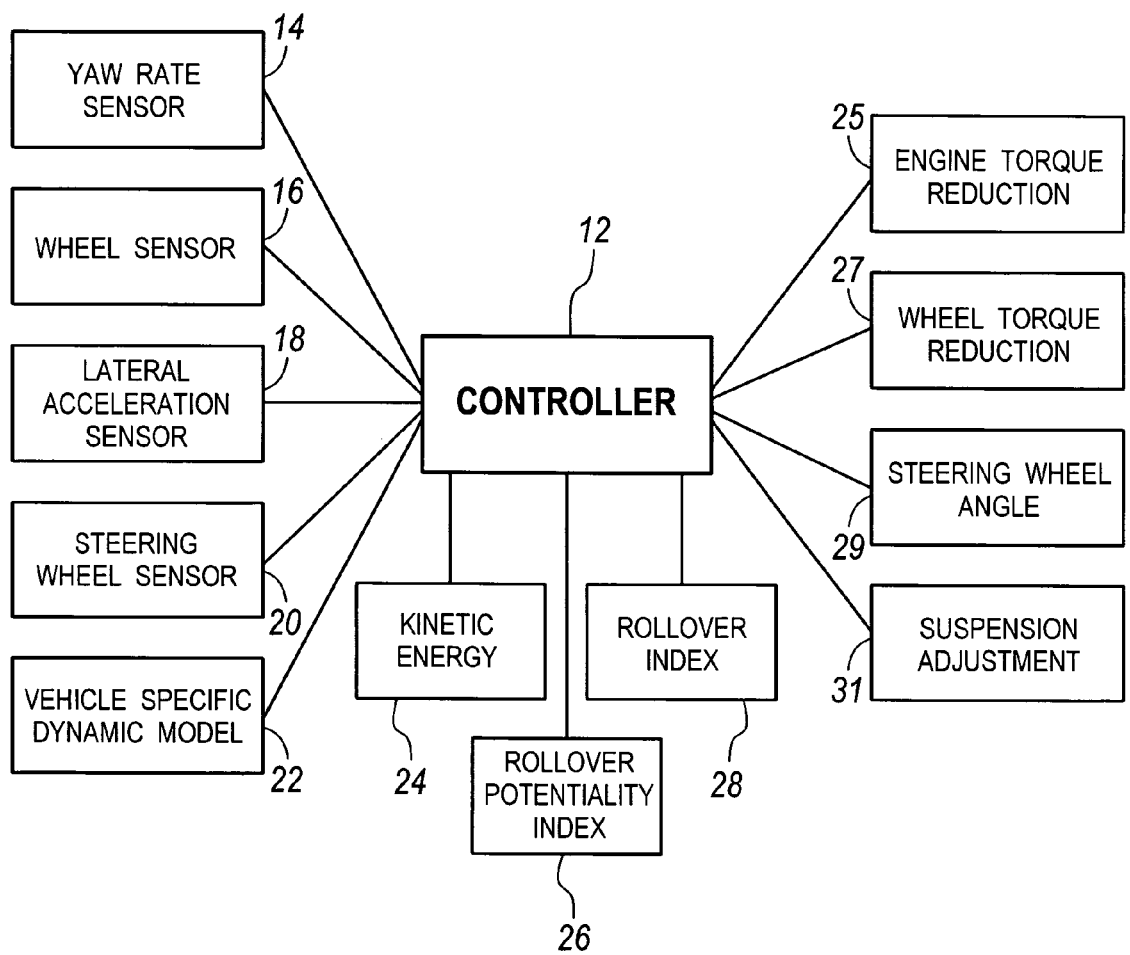
FIG. 1 illustrates block diagram of a rollover sensing system for determining a rollover event and counteracting an actual rollover.

Referring now to the Drawings and particularly to FIG. 1, there is shown a block diagram of a rollover sensing system for determining a rollover event and providing control actions to reduce the likelihood of an actual rollover. A controller 12 is coupled to a plurality of sensing devices located throughout a vehicle 10 (shown in FIG. 2) for monitoring vehicle operating parameters. The controller 12 receives signals from the plurality of sensing devices concerning the vehicle operating parameters for determining when the vehicle 10 is in a condition to potentially rollover and to provide a control action to counteract an anticipated rollover. A plurality of sensors comprises a yaw rate sensor 14 for sensing a yaw rate of the vehicle 10, a wheel sensor 16 for sensing a speed of the vehicle 10, a lateral acceleration sensor 18 for sensing a lateral acceleration ($a_{ym}$) 38 of the vehicle 10, and a steering wheel sensor 20 for sensing a steering wheel angle of the vehicle 10. A vehicle specific dynamic model 22 is stored in the controller's memory, or alternatively, in a separate memory storage device for providing specific vehicle characteristics when determining the occurrence of a rollover event.

After the vehicle operating parameter data is retrieved from the plurality of sensors, the controller determines a lateral kinetic energy 24 of the vehicle 10. The kinetic energy 24 and the lateral acceleration ($a_{ym}$) 38 are used to determine a rollover potentiality index ($\Phi_0$) 26. A rollover index ($\Phi$) 28 is thereafter determined by weighting the rollover potentiality index ($\Phi_0$) 26. If the controller 12 determines rollover index ($\Phi$) 28 to be at a critical stage where an actual rollover may occur if the current vehicle operating parameters are maintained, then the controller 12 detects a rollover event and provides a control signal for taking a corrective action to counteract an actual rollover. The controller 12 provides a signal to a specific device or secondary controller for providing at least one control action to counteract the actual rollover. Control actions may comprise an engine torque reduction such as a change in the engine output 25 or an actuation of the brakes 27, a steering wheel angle adjustment 29, or a suspension adjustment 31.

Figure 2:
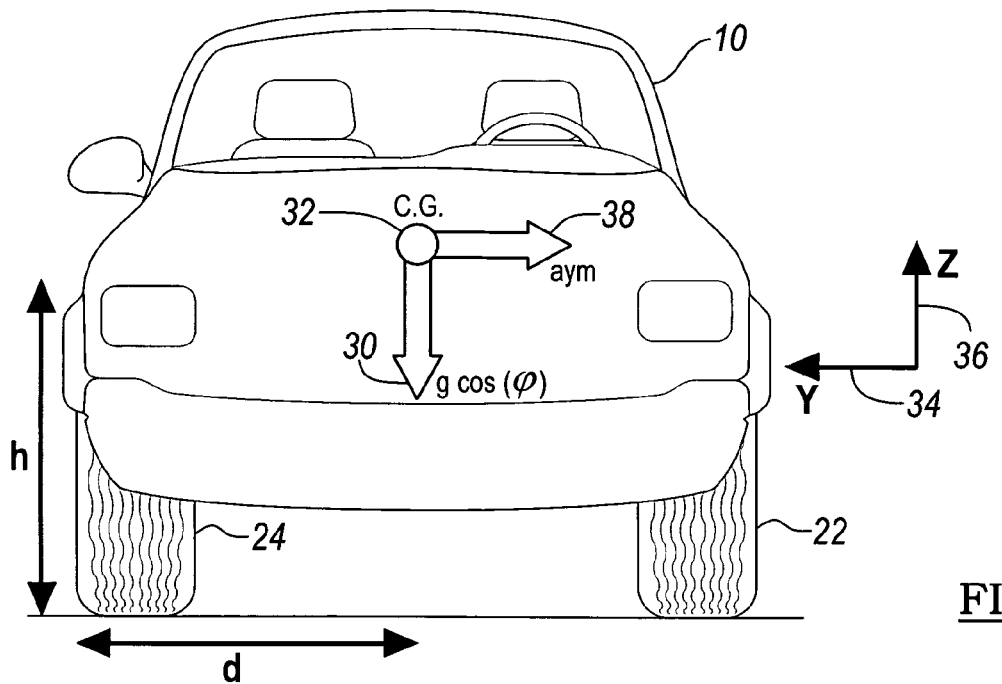
FIG. 2 illustrates a front view of a vehicle with illustrates a center of gravity sprung mass having a gravitational and lateral force exerted on the vehicle.

FIG. 2 shows a vehicle 10 having a sprung mass high center of gravity C.G. 32 such as a van or a sport utility vehicle. A y-axis 34 and a z-axis 36 represent directional planes of a vehicle sprung mass C.G. 32 while traveling along a road. The set of axes are fixed to the vehicle spring mass C.G. 32 and rotate with the vehicle spring mass C.G. 32. The vehicle 10 has a lateral acceleration $(a_{ym})$ 38 that is a vector force exerted by the vehicle 10 along the y-axis 34. The lateral acceleration $(a_{ym})$ 38 is measured by an accelerometer attached to the vehicle sprung mass C.G. and based partly on vehicle acceleration and partly on gravity. A force exerted along the Z-axis 36 is a gravitational force 30 represented by:

$$g \cos(\phi)$$

where g is a gravitational constant and $\phi$ is a roll angle of the vehicle sprung mass C.G. 12 relating to the lateral acceleration $(a_{ym})$ 38 and/or if present the super elevation angle of the road surface. The vehicle 10 while driving on a flat surface having a 0° roll angle would have a gravitational force 30 equal to the gravitational constant (g) since the cos 0°=1. A nominal height (h) is measured from the road to the vehicle sprung mass C.G. 12 while the half track width (d) represents the width from a tire outside edge to the vehicle sprung mass C.G 12. Nominal height (h) and half track width (d) are stored in memory as part of the vehicle specific dynamic model 22.

Figure 3:
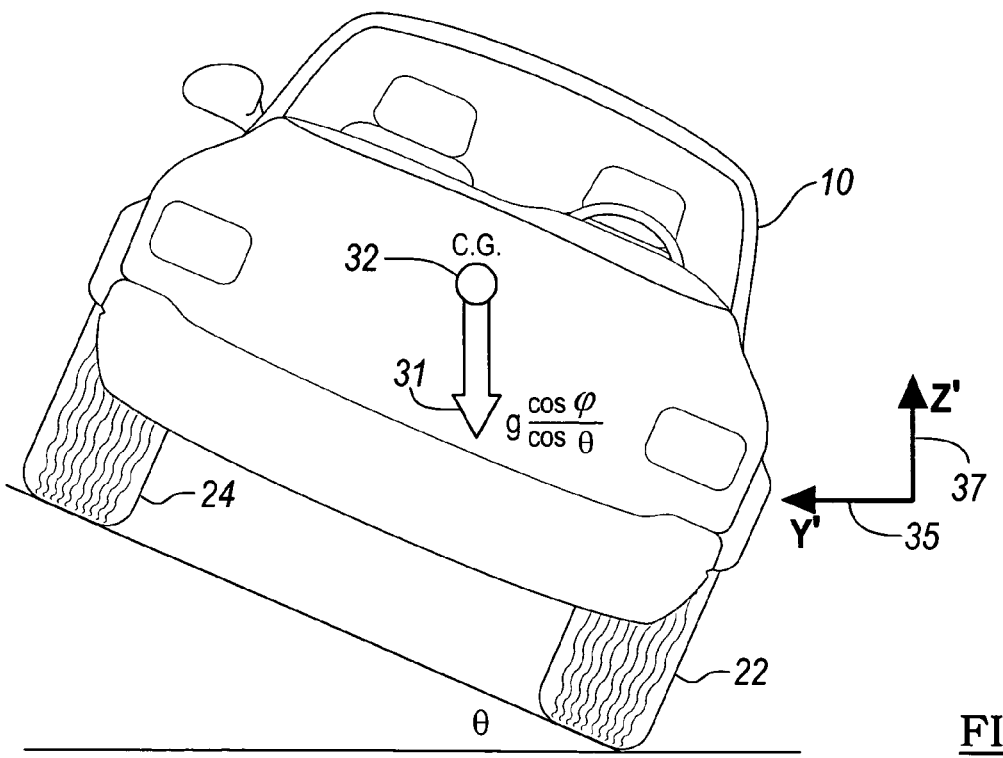
FIG. 3 illustrates the front view of the vehicle with the vehicle in a condition of imminent threat of rollover.

FIG. 3 represents the vehicle 10 having a first pair of wheels on a first side of the vehicle 10 in contact with the road surface and a second pair of wheels elevated from the road surface while the vehicle 10 is tilted from the horizontal by an angle θ. A net gravitational force 31 acting on the vehicle sprung mass C.G. 12 while in the tilted position is represented by the following formula:

$$g \cos(\phi)/\cos(\theta)$$

A set of reconfigured coordinate axes are shown relating to the tilted vehicle 10. A z'-axis 26 is parallel to the net gravitational force acting on the vehicle sprung mass C.G. 12 while a y'-axis 35 of the lateral acceleration $(a_{ym})$ 38 is always equal to zero.

A minimum amount of potential energy required for an actual roll over is the net gravitational force times the differential in height between the nominal height in a static condition and the ultimate height of the vehicle sprung mass C.G. 32 at the verge of rollover defined by the formula:

$$(g \cos \phi/\cos \theta)*\Delta h$$

If (h) is defined as the nominal height of the vehicle sprung mass C.G. 12 while all wheels are in contact with the road surface (as shown in FIG. 2), then a current height of the vehicle sprung mass C.G. 12 may be defined by the formula:

$$d \sin(\theta)+h \cos(\theta),$$

and the ultimate height of vehicle sprung mass C.G. 12 when the vehicle 10 is at the verge of the actual roll over is defined by the formula:

$$\sqrt{d^2+h^2}$$

Therefore, the height change (Δh) of the vehicle sprung mass C.G. 12 required for roll over is defined by the formula:

$$\Delta h = \sqrt{d^2+h^2} - (d \sin \theta + h \cos \theta)$$

which leads to $$\Delta h = \sqrt{d^2 + h^2} - \frac{da_{ym} + hg\cos\varphi}{\sqrt{g^2\cos^2\varphi + a_{ym}^2}}$$

Since the lateral kinetic energy of the vehicle 10 can be converted to potential energy very quickly through a rolling motion, the vehicle 10 has a potential to roll over at any time if the lateral kinetic energy is greater than or equal to the minimum amount of potential energy required for actual rollover. The lateral kinetic energy is defined by the formula:

$$\frac{1}{2}V_y^2,$$

where $V_y$ is the vehicle's lateral velocity, therefore $$\frac{1}{2}V_y^2 > \frac{g\cos\varphi}{\cos\theta}\Delta_h$$

which leads to $$\frac{1}{2}V_y^2 > \sqrt{g^2\cos^2\varphi + a_{ym}^2}\,\Delta h$$

which leads to $$\frac{1}{2}V_y^2 > \sqrt{g^2\cos^2\varphi + a_{ym}^2}\,\sqrt{d^2+h^2}\, - (da_{ym} + hg\cos\varphi)$$

The lateral velocity $(V_y)$ can be calculated from longitudinal velocity $(V_x)$ and vehicle side slip angle (β) as:

$$V_y = V_x \beta$$

The longitudinal velocity $(V_x)$ is the velocity of the vehicle 10 traveling along the road and is measured by wheel speed sensors. The vehicle side slip angle (β) is determined by the controller monitoring the yaw rate, the lateral acceleration $(a_{ym})$ 38, the steering wheel angle, and a specific vehicle dynamic model of the vehicle 10.

A rollover potentiality index $(\Phi_O)$ 26 is determined from the difference between the vehicle lateral kinetic energy and the minimum potential energy required for rollover. The rollover potentiality index $(\Phi_O)$ 26 is defined by the following formula:

$$\Phi_0 = \frac{1}{2}|V_x\beta|^2 - \sqrt{g^2 + a_{ym}^2}\,\sqrt{d^2+h^2}\, + da_{ym} + hg$$

In determining the rollover potentiality index $(\Phi_O)$ 26 from the above inequality condition, cos φ is neglected. The objective of rollover algorithm applied by the controller is to detect the rollover event. The rollover event is defined as a condition where corrective action is taken to counteract an actual rollover. This requires that the rollover event is identified prior to the rollover angle becoming excessive resulting in the actual rollover. In determining whether omitting the roll angle from the inequality equation results in a significant error, a roll angle ϕ of 25 degrees is factored into the above inequality equation where cos (25°) is equal to 0.9. The effect of neglecting cos ϕ on the rollover potentiality index ($\Phi_0$) 26 using ϕ equal to 25 degrees is less than 0.4% of the rollover potentiality index ($\Phi_0$) 26. The error of 0.4% is less than the uncertainties of the vehicle parameters and the estimated vehicle side slip angle, and therefore, the roll angle ϕ may be neglected when determining the rollover potentiality index ($\Phi_0$) 26.

When the rollover rollover potentiality index ($\Phi_0$) 26 is positive, the vehicle 10 has a potential to rollover. The potential to rollover increases with an increasing rollover potentiality index ($\Phi_0$) 26. However, a large rollover potentiality index ($\Phi_0$) 26 alone does not necessarily indicate that the vehicle 10 will rollover. The large kinetic energy needs to be converted to potential energy. This typically occurs when the vehicle 10 hits a high mu surface or a bump after a large side slip typically on a low mu surface. When the vehicle 10 hits a high mu surface, the lateral acceleration ($a_{ym}$) 38 of the vehicle 10 increases very rapidly. In the preferred embodiment, the measured lateral acceleration ($a_{ym}$) 38 needs to be more than 80% of statically critical lateral acceleration for roll over to occur. However, in other preferred embodiments, the measured lateral acceleration ($a_{ym}$) 38 may be any variable less than 100% of the statically critical lateral acceleration for roll over to occur for a respective vehicle. A statically critical lateral acceleration is defined as an acceleration required to make the vehicle 10 rollover on a flat surface which is represented by the formula:

$$(d/h)*g$$

In determining a rollover index (Φ) 28 from the measured lateral acceleration ($a_{ym}$) 38 and the statically critical lateral acceleration, the rollover index (Φ) 28 is defined by the following formula:

$$\Phi = \Phi_0 \times \left(|a_{ym}| - \frac{d}{h}g \times 0.8 > 0\right)$$

The rollover index (Φ) 28 is the rollover potentiality index ($\Phi_0$) 26 weighted by the measured acceleration less the statically critical lateral acceleration. When the absolute value of the measured lateral acceleration ($a_{ym}$) 38 is less then 80% of the critical acceleration, the index is zero and the potential for an actual rollover is not present. When the rollover index (Φ) 28 yields a positive number, the rollover index (Φ) 28 will be compared against a predetermined threshold. If the rollover index (Φ) 28 is above the predetermined threshold, then the controller 12 will provide signal to take a control action to counteract the vehicle 10 from rolling over.

Figure 4:
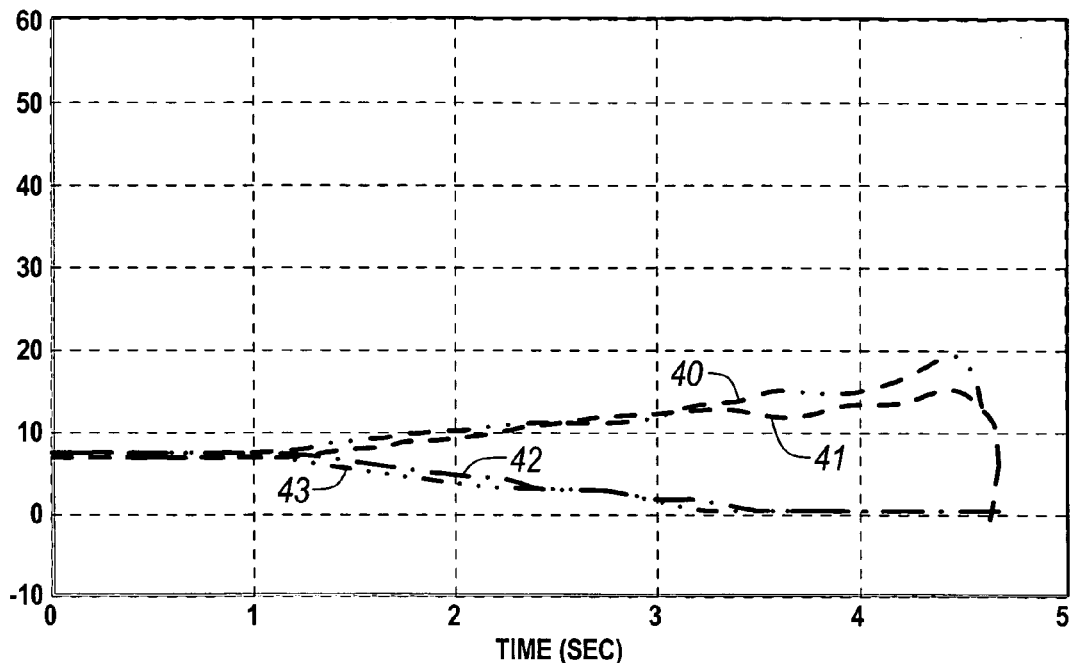
FIG. 4 illustrates a graph displaying tire normal forces of a vehicle during a slowly increasing steering wheel angle maneuver.
Figure 5:
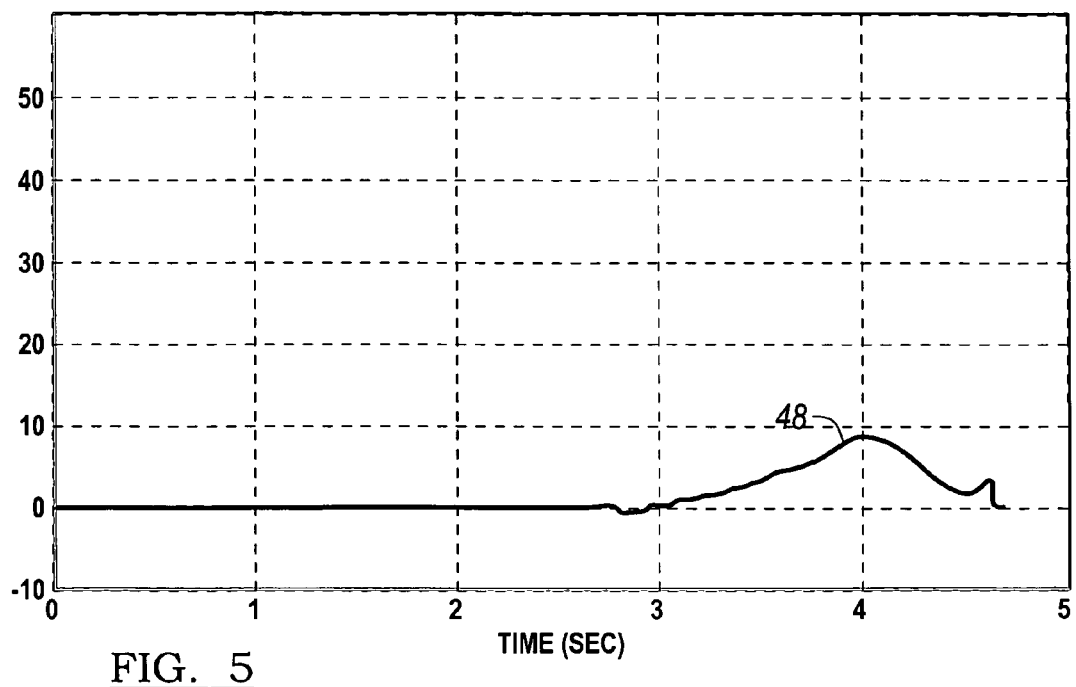
FIG. 5 illustrates a graph displaying a calculated roll index of a vehicle during a slowly increasing steering wheel angle maneuver.
Figure 6:
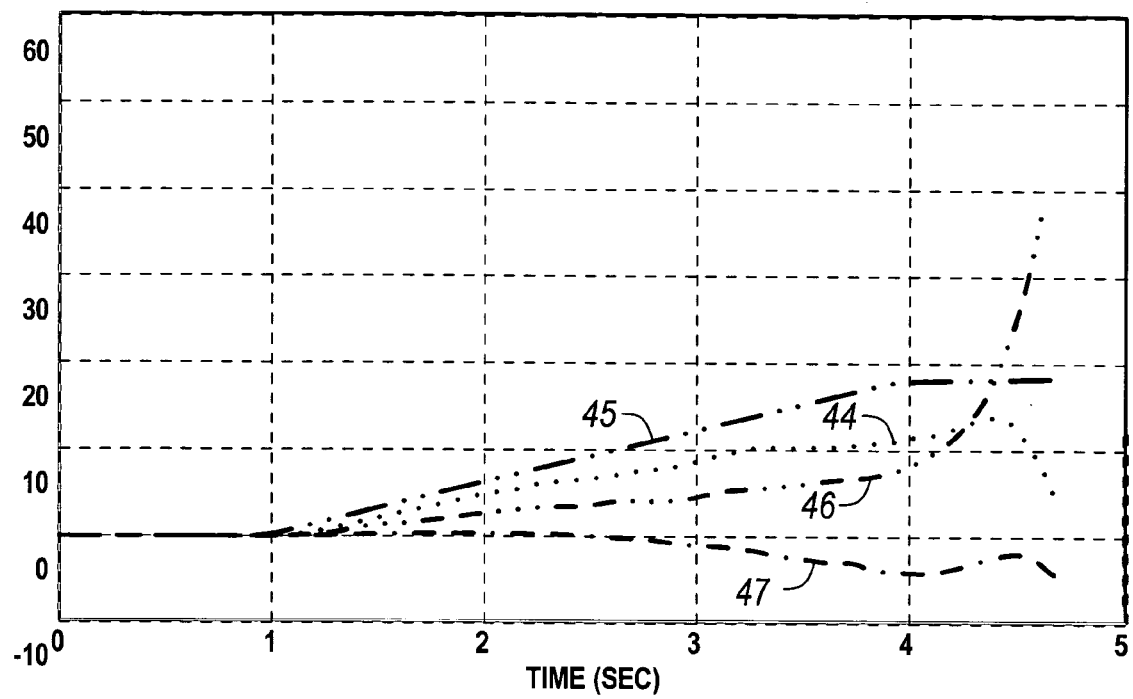
FIG. 6 illustrates a graph displaying vehicle states during a slowly increasing steering wheel angle maneuver.

FIG. 4–6 illustrates graphs of a vehicle making a slowly increasing steering wheel angle maneuver showing the measured and calculated vehicle operating parameters, forces, and vehicle states of the vehicle 10. The roll angle is included to show a correlation between the calculated data for determining a rollover event and the actual rollover occurrence. A plurality of data output measurements and calculations are shown for the vehicle 10 for a given driving maneuver. In FIG. 4, data lines 40, 41, 42, and 43 represent tire normal forces of the vehicle 10. Data lines 40 and 41 represent the normal forces of a front right tire and a rear right tire, respectively, while data lines 42 and 43 represent normal forces of a front left tire and a rear left tire, respectively. The horizontal axis is a measurement in units of time (e.g., seconds). The vertical axis in FIG. 4 represents the normal force exerted on each tire. When the steering wheel angle is zero, the left side tire normal force is equal to the right side tire normal force. As a respective tire lifts from the surface of the road, the normal force for the respective tire decreases to zero. Thus, at time=0 all four tires are in contact with the surface of the road and the left side tire normal force is equal to the right side tire normal force. At time>1, the front and rear left tires begin to lift off the surface of the road as the vehicle 10 is tilted and the front and rear right tires depress into the road surface as illustrated by the increasing data lines 40 and 41. Also at time=1 second, the lateral acceleration ($a_{ym}$) 38, steering wheel angle, and roll angle commence to increase. This is represented by data lines 44, 45, and 46, respectively, as shown in FIG. 6. The roll index and vehicle side slip angle are constant, as represented by data lines 48 (FIG. 5) and 47 (FIG. 6) respectively, since a potential rollover event is not present at this time. At about-time=3, the front and rear left tires are about completely lifted from the surface of the road as shown by data lines 42 and 43 (FIG. 4) and the normal force exerted by the vehicle is displaced entirely on the front and rear right tires. Also at time=3, the vehicle side slip angle begins to displace from a constant reading. At approximately the same time, the roll index also begins to increase. At time=4, the roll angle becomes increasingly large such that an actual vehicle rollover is about to occur. To counteract the actual rollover from occurring, corrective action must occur prior to the vehicle 10 reaching the verge of rollover. This requires that sufficient time is allocated to initiate a control action for counteracting an actual rollover. At time=3, when the roll index data line 47 (FIG. 6) is positively displaced, the controller preferably provides a control action for counteracting an actual rollover. This allows for at least one second to initiate a control action.

Figure 7:
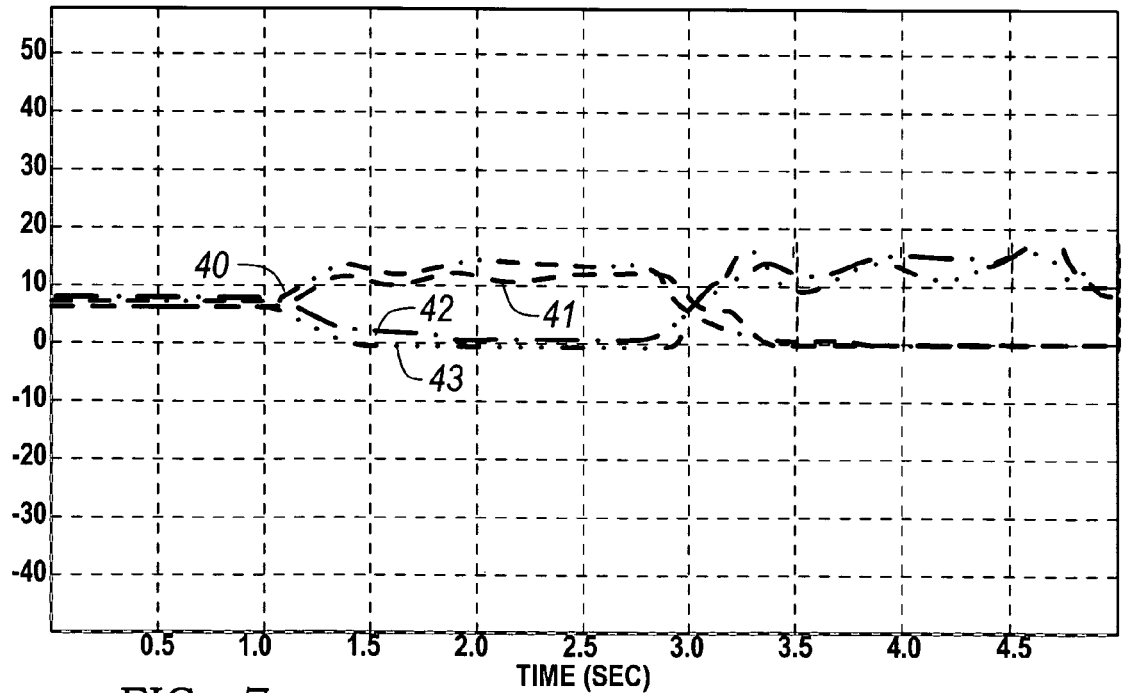
FIG. 7 illustrates a graph displaying tire normal forces of a vehicle during a rapid steering maneuver.
Figure 8:
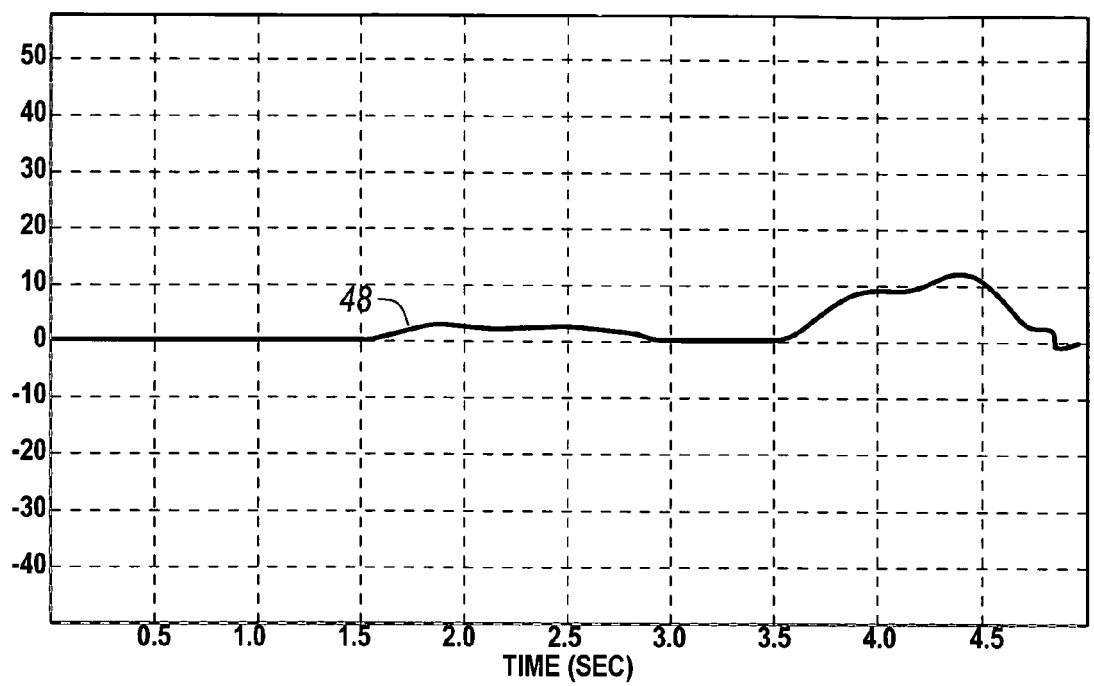
FIG. 8 illustrates a graph displaying a calculated roll index of a vehicle during a rapid steering maneuver.
Figure 9:
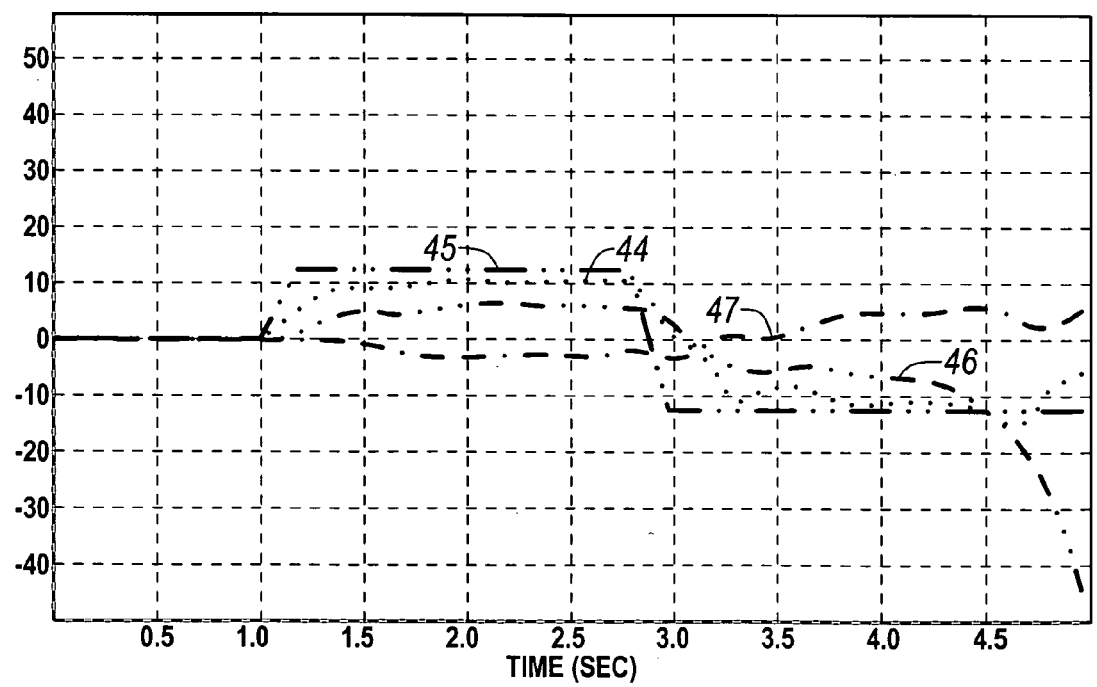
FIG. 9 illustrates a graph displaying vehicle states during a rapid steering maneuver.

FIGS. 7–9 illustrates graphs of a vehicle 10 making a rapid steering maneuver showing the measured and calculated vehicle 10 operating parameters and forces exerted on the vehicle 10. The rapid steering maneuver is indicative of the vehicle 10 making a sharp turn to the left causing wheel lift on the left side tires and then making a sharp turn to the right causing the wheel lift on the right side tires. The graph of FIG. 7 shows that at time=1.5 wheel lift occurs on the front and rear left tires as indicated by data lines 42 and 43, respectively. The vehicle side slip angle data line 47 (FIG. 9) and the roll index data line 48 (FIG. 8) both displaced at about time=1.5 which are indicative of a potential rollover as indicated by the increased roll angle and forces exerted on the vehicle. Should corrective action be taken, the controller 12 would provide a control action at approximately time=1.5 to avoid an actual rollover. As the steering wheel angle is changed so as to steer the vehicle 10 toward the right, the front and rear left side tires are brought into contact with the road and are displaced into the surface of the road and the front and rear right tires are lifted from the surface of the road as illustrated by data lines 40, 41, 42, and 43 (FIG. 7) at time>3.5 seconds. From the graphs of FIGS. 7–9, the roll index data line is displaced at the same time that the vehicle side slip angle is displaced from its original constant when all four tires were in contact with the surface of the road. These graphs show that the measured roll angle is critical at time=4.5 whereas the vehicle 10 would commence an actual rollover. Should a corrective action be taken, the controller preferably initiates a control action at time=3.5, correlating to the displacement of the rollover index data line 48 (FIG. 8) and the vehicle side slip angle 47 (FIG. 7).

FIG. 10 illustrates a method for estimating a propensity of a vehicle 10 to rollover. In step 50, the lateral acceleration is measured using a sensor such as an accelerometer. In step 52, the lateral kinetic energy of the vehicle is determined. The lateral kinetic energy is derived from the vehicle longitudinal velocity and the vehicle side slip angle. The vehicle longitudinal velocity is the speed of the vehicle 10 traveling along the road and may be measured from a vehicle wheel in contact with the surface of the road. The vehicle side slip angle is determined by the controller in response to retrieved from a plurality of sensing devices throughout the vehicle for providing data on the yaw rate, the steering wheel angle, the lateral acceleration, and data from a dynamic model of the vehicle. In step 54, the rollover potentiality index is determined in response to the data derived in step 50 and 52. The rollover potentiality index provides the difference between the lateral kinetic energy and the minimum potential energy required for rollover.

FIG. 11 illustrates a method for estimating a rollover event of a vehicle where the rollover event is defined as a moment when a corrective action is taken to counteract an actual rollover. In step 60, the lateral kinetic energy of the vehicle is determined from the vehicle longitudinal velocity and the vehicle side slip angle. In step 62, the lateral acceleration is measured from a sensing device such as an accelerometer. A rollover potentiality index is then determined from the lateral kinetic energy and the lateral acceleration in step 64. The rollover potentiality index provides the difference between the lateral kinetic energy and the minimum potential energy required for rollover. In step 66, a rollover index is determined by weighting the rollover potentiality index by a factor of the lateral acceleration. The weighting factor is derived from a difference in the measured lateral acceleration less a percentage of the statically critical lateral acceleration required for rollover to occur. In step 68, the rollover index is compared to a predetermined threshold. In step 70, a determination is made whether the rollover index is greater than the predetermined threshold. If a determination is made that the rollover index is less than the predetermined threshold, a return is made to step 60 to retrieve data regarding operating parameters to determine if changes have occurred to the kinetic energy and lateral acceleration of the vehicle. If a determination is made is step 70 that the rollover index is greater than or equal to the predetermined threshold, the controller activates a control action for changing at least one of the operating parameters for counteracting the anticipated rollover in step 72.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for estimating a propensity of a vehicle to rollover, the method comprising the steps of:
   determining a lateral kinetic energy of said vehicle in response to a vehicle longitudinal velocity and a vehicle side slip angle;
   measuring a lateral acceleration of said vehicle;
   calculating a minimum potential energy of said vehicle require for rollover;
   determining a rollover potentiality index in response to said lateral kinetic energy, said minimum potential energy, and said lateral acceleration; and
   providing a control action to counteract an anticipated rollover in response to said rollover potentiality index.

2. A method for detecting a rollover event of a vehicle, the method comprising the steps of:
   determining a lateral kinetic energy of said vehicle in response to a vehicle longitudinal velocity and a vehicle side slip angle;
   measuring a lateral acceleration of said vehicle;
   determining a rollover potentiality index in response to said lateral kinetic energy and said lateral acceleration;
   determining a rollover index by weighting said rollover potentiality index by a factor of said lateral acceleration;
   determining if said rollover index is above a predetermined threshold;
   detecting said rollover event in response to said rollover index being above said predetermined threshold;
   providing a control action to counteract an anticipated rollover in response to said rollover potentiality index.

3. The method of claim 2, wherein said vehicle longitudinal velocity is determined by monitoring wheel speed sensors.

4. The method of claim 2 wherein said vehicle side slip angle is determined by monitoring a yaw rate of said vehicle, a lateral acceleration of said vehicle, a steering wheel angle of said vehicle, and a vehicle dynamic model.

5. The method of claim 2 wherein said lateral acceleration is determined by monitoring an accelerometer.

6. The method of claim 2 wherein said rollover event comprises a condition wherein a corrective action is taken to counteract an actual rollover.

7. The method of claim 2 further comprising a control action for changing at least one operating parameter of said vehicle in response to detecting said rollover event to counteract an actual rollover from occurring.

8. The method of claim 7 wherein said control action comprises a torque reduction applied to at least one wheel of said vehicle in response to said control action.

9. The method of claim 8 wherein said torque reduction comprises an actuation of a brake.

10. The method of claim 7 wherein said control action comprises a torque reduction change in said engine output.

11. The method of claim 7 wherein said control action comprises an automated steering adjustment.

12. The method of claim 7 wherein said control action comprises an automated suspension adjustment.

13. A system for estimating a propensity of a vehicle to rollover, the system comprising:
   at least one wheel sensor for measuring the vehicle longitudinal velocity;
   a yaw rate sensor;
   a lateral acceleration sensor;
   a steering wheel sensor;
   a vehicle specific dynamic model; and
   a controller for determining a side slip angle and for determining a rollover potentiality index in response to weighting said rollover potentiality index by a factor of a measured lateral acceleration for determining a rollover index, said rollover index being indicative of said vehicle propensity to rollover, wherein a control action is generated in response to said rollover index for counteracting an anticipated rollover.

14. The system of claim 13 wherein said lateral acceleration sensor comprises an accelerometer.

15. The system of claim 13 further comprising a control action for changing at least one operating parameter of said vehicle in response to detecting said rollover event to prevent an actual rollover from occurring.

16. The system of claim 15 wherein said at least one operating parameter comprises a torque reduction of said engine output.

17. The system of claim 15 wherein said at least one operating parameter comprises a torque reduction of at least one wheel.

18. The system of claim 17 wherein said torque reduction comprises an actuation of a brake.

19. The system of claim 15 further comprising an automated steering adjustment system for adjusting said at least one operating parameter.

20. The system of claim 15 further comprising an automated suspension adjustment system for adjusting said at least one operating parameter.

21. A method for detecting a rollover event of a vehicle, the method comprising the steps of:
determining a lateral kinetic energy of said vehicle in response to a vehicle longitudinal velocity and a vehicle side slip angle;
measuring a lateral acceleration of said vehicle;
determining a rollover potentiality index in response to said lateral kinetic energy and said lateral acceleration;
determining a rollover index by weighting said rollover potentiality index by a factor of said lateral acceleration;
determining if said rollover index is above a predetermined threshold said rollover index being indicative of said vehicle propensity to rollover when above said predetermined threshold; and
providing a control action to counteract an anticipated rollover in response to said rollover potentiality index being above a predetermined threshold;
wherein said rollover potentiality index is represented by the formula:

$$\Phi_0 = \frac{1}{2}|V_x\beta|^2 - \sqrt{g^2 + a_{ym}^2}\sqrt{d^2 + h^2} + da_{ym} + hg,$$

where $V_x$ is said vehicle longitudinal velocity, $\beta$ is said vehicle side slip angle, g is a gravity constant, $a_{ym}$ is said measured lateral acceleration, d is one half a vehicle track width, and h is a nominal center of gravity height.

22. The method of claim 21 wherein said rollover index is represented by the formula:

$$\Phi = (\Phi_0)(|a_{ym}| - (d/h)(g)0.8 > 0).$$

23. A system for estimating a propensity of a vehicle to rollover, the system comprising:
at least one wheel sensor for measuring the vehicle longitudinal velocity;
a yaw rate sensor,
a lateral acceleration sensor;
a steering wheel sensor;
a vehicle specific dynamic model; and
a controller for determining a side slip angle and for determining a rollover potentiality index in response to weighting said rollover potentiality index by a factor of a measured lateral acceleration for determining a rollover index, said rollover index being indicative of said vehicle propensity to rollover, and wherein a control action is generated in response to said rollover index for counteracting an anticipated rollover,
wherein said rollover potentiality index is represented by the formula:

$$\Phi_0 = \frac{1}{2}|V_x\beta|^2 - \sqrt{g^2 + a_{ym}^2}\sqrt{d^2 + h^2} + da_{ym} + hg,$$

where $V_x$ is said vehicle longitudinal velocity, $\beta$ is said vehicle side slip angle, g is a gravity constants $a_{ym}$ is said measured lateral acceleration, where d is one half a vehicle track width, and h is a nominal center of gravity height.

24. The system of claim 23 wherein said rollover index is represented by the formula:

$$\Phi = (\Phi_0)(|a_{ym}| - (d/h)(g)0.8 > 0).$$

25. A method for estimating a propensity of a vehicle to rollover, the method comprising the steps of:
calculating a lateral kinetic energy of the vehicle;
calculating a minimum potential energy of the vehicle required for rollover, said minimum potential energy calculation determined using sensed dynamic characteristics of the vehicle not including a vehicle roll angle sensor signal or a vehicle roll rate sensor signal; and
determining a rollover potentiality index in response to said calculated lateral kinetic energy and said calculated minimum potential energy wherein said rollover potentiality index is identifiable with said vehicle propensity to rollover and is adaptable for identifying when to implement a control action for reduce said propensity of said vehicle to rollover.

26. The method of claim 25 further comprising the step of implementing a control action to reduce said propensity of said vehicle to rollover in the event said rollover potentiality index is greater than a predetermined threshold.

27. The method of claim 26 including the step of measuring a lateral acceleration of said vehicle, wherein said control action is only implemented if said measured lateral acceleration is greater than a predetermined amount which is a function of a critical lateral acceleration indicative of a vehicle rollover event.

28. The method of claim 25 wherein said lateral kinetic energy is calculated using a vehicle longitudinal velocity characteristic and a vehicle side slip characteristic.

29. A method for estimating a propensity of a vehicle to rollover, the method comprising the steps of:
providing a plurality of sensors for generating sensor signals representing dynamic characteristics of said vehicle including a lateral acceleration sensor but not including a vehicle roll angle sensor or a vehicle roll rate sensor;
calculating a lateral kinetic energy of said vehicle using said sensor signals;
calculating a minimum potential energy of said vehicle required for rollover using said sensor signals;
determining a rollover potentiality index in response to said calculated lateral kinetic energy, said calculated minimum potential energy and a lateral acceleration signal; and
implementing a control action to reduce said propensity of said vehicle to rollover in the event said rollover potentiality index is greater than a predetermined threshold.

30. A method for estimating a propensity of a vehicle to rollover, the method comprising the steps of:
calculating a lateral kinetic energy of said vehicle;
measuring a lateral acceleration of said vehicle;
calculating a minimum potential energy of said vehicle required for rollover;

determining a rollover potentiality index in response to said calculated lateral kinetic energy and said calculated minimum potential energy;

determining if said measured lateral acceleration is more than a predetermined percentage of a statically critical lateral acceleration; and determining whether said vehicle has a propensity to rollover in response to said rollover potentiality index and said determination of said measured lateral acceleration being more that said predetermined percentage of said statically critical lateral acceleration, said rollover potentiality index is identifiable with said vehicle propensity to rollover and is adaptable for identifying when to implement a control action for reducing said propensity of said vehicle to rollover.

* * * * *

UNITED STATES PATENT AND TRADEMARK OFFICE
CERTIFICATE OF CORRECTION

| | | |
|---|---|---|
| PATENT NO. | : 7,165,008 B2 | Page 1 of 1 |
| APPLICATION NO. | : 10/719968 | |
| DATED | : January 16, 2007 | |
| INVENTOR(S) | : S. Ben Choi | |

It is certified that error appears in the above-identified patent and that said Letters Patent is hereby corrected as shown below:

Column 9, Claim 21, Line 32, after "threshold" insert a --,--.
Column 10, Claim 23, Line 8, delete "constants" and insert --constant,--.

Signed and Sealed this

Twenty-seventh Day of March, 2007

JON W. DUDAS
*Director of the United States Patent and Trademark Office*